(12) United States Patent
Brinkman

(10) Patent No.: US 6,571,508 B2
(45) Date of Patent: Jun. 3, 2003

(54) FISH CATCHING SYSTEM

(75) Inventor: Stephen M. Brinkman, Beeville, TX (US)

(73) Assignee: S&C Brinkman Corporation, Beeville, TX (US)

( * ) Notice: Subject to any disclaimer, the term of this patent is extended or adjusted under 35 U.S.C. 154(b) by 0 days.

(21) Appl. No.: 09/745,235

(22) Filed: Dec. 20, 2000

(65) Prior Publication Data

US 2002/0073604 A1 Jun. 20, 2002

(51) Int. Cl.[7] ................................................. A01K 85/02
(52) U.S. Cl. ........................... 43/42.02; 43/4.5; 43/42.24
(58) Field of Search ................................ 43/4.5, 42.02, 43/42.21, 42.2, 42.24–42.28, 42.3, 42.31, 42.39

(56) References Cited

U.S. PATENT DOCUMENTS 3,867,781 A * 2/1975 Wolfe ......................... 43/42.09
4,208,822 A * 6/1980 Bryant ........................ 43/42.02
5,025,586 A * 6/1991 Pixton ......................... 43/42.24
5,167,089 A * 12/1992 Schriefer ..................... 43/42.36
5,832,655 A * 11/1998 Crumrine ..................... 43/42.39
5,894,692 A * 4/1999 Firmin ........................ 43/42.02

* cited by examiner

*Primary Examiner*—Charles T. Jordan
*Assistant Examiner*—Bret Hayes
(74) *Attorney, Agent, or Firm*—Christopher L. Makay

(57) ABSTRACT

A fish catching system includes a lure manipulator, a hook, and a lure secured in a first position between the lure manipulator and the hook. A fishing line passes through the lure manipulator and attaches to the hook. Pulling the fishing line through the lure manipulator moves the lure to a second position, and releasing the fishing line returns the lure to the first position. Alternatively, the fishing line attaches directly to the hook, and the lure manipulator resides on the hook. Pulling the fishing line moves the hook through the lure manipulator to place the lure in a second position, and releasing the fishing line returns the hook through the lure manipulator to place the lure in the first position.

19 Claims, 3 Drawing Sheets

FISH CATCHING SYSTEM

BACKGROUND OF THE INVENTION

1. Field of the Invention

The present invention relates to fishing and, more particularly, but not by way of limitation to a fish catching system.

2. Description of the Related Art

Game fish, such as bass, spend the majority of their time hiding in weeds or under fallen trees in order to prey on unsuspecting smaller fish and animals as well as avoid larger predator fish. Consequently, sight is the sense game fish primarily rely upon to discern movement in the water, thus allowing them to seize smaller fish and animals or avoid a larger predator fish.

Knowing game fish habits allows anglers to tailor their fishing methods to those habits, thereby achieving the best results. Illustratively, an effective fishing method consists of attaching a weight to a fishing line supported by a rod and reel above a hook also attached to the fishing line. A plastic worm is then placed on the hook, and all three are cast into a weed filled body of water and allowed to sink to the bottom. Once on bottom, the weight, hook, and plastic worm are pulled off bottom and reeled six to twelve inches before being allowed to return to the bottom. This procedure is repeated until the weight, hook, and plastic worm have been retrieved completely. In systematically moving the weight, hook, and plastic worm on and off bottom, an angler attempts to simulate the movement of a worm through the water, thereby attracting a game fish's attention resulting in a strike upon the plastic worm and subsequent hooking of the game fish. Although the foregoing method is effective, it would be even more effective in attracting the attention of game fish if the plastic worm could be manipulated without the necessity of reeling in the fishing line.

SUMMARY OF THE INVENTION

In accordance with the present invention, a first embodiment of a fish catching system includes a lure manipulator. The lure manipulator includes a lure retainer, a head coupled with the lure retainer, and a passageway through the head and the lure retainer that receives a fishing line therethrough. The first embodiment of the fish catching system further includes a hook having a barb and an eyelet that receives the fishing line passed through the passageway of the lure manipulator. The first embodiment of the fish catching system still further includes a lure secured in a first position to the lure retainer and to the barb, whereby pulling the fishing line through the passageway moves the lure to a second position and releasing the fishing line returns the lure to the first position.

A second embodiment of a fish catching system includes a lure manipulator. The lure manipulator includes a lure retainer, a head coupled with the lure retainer, a passageway through the head and the lure retainer that receives a shaft of a hook therein, and a slot through the head and the lure retainer terminating in the passageway, whereby the slot receives the shaft of the hook therethrough and is movable to a position that retains the hook within the passageway. The second embodiment of the fish catching system further includes a hook having a barb and a shaft terminating in an eyelet that receives a fishing line. The second embodiment of the fish catching system still farther includes a lure secured in a first position to the lure retainer and to the barb, whereby pulling the fishing line moves the shaft of the hook through the passageway to place the lure in a second position and releasing the fishing line returns the shaft of the hook through the passageway to place the lure in the first position.

A third embodiment of the fish catching system includes a hook having a barb and a shaft terminating in an eyelet that receives a fishing line. The third embodiment of the fish catching system includes a lure manipulator having a lure retainer, a head coupled with the lure retainer, and a passageway therethrough that receives the shaft of the hook therein. The third embodiment of the fish catching system still further includes a lure secured in a first position to the lure retainer and to the barb, whereby pulling the fishing line moves the shaft of the hook through the passageway to place the lure in a second position and releasing the fishing line returns the shaft of the hook through the passageway to place the lure in the first position.

It is therefore an object of the present invention to provide a fish catching system that permits movement of a lure independent of reeling a fishing line.

It is another object of the present invention to provide a fish catching system that simulates live game fish prey.

It is a further object of the present invention to provide a fish catching system suitable to provide lure movement even when stationary on the bottom of a body of water.

Still other objects, features, and advantages of the present invention will become evident to those of ordinary skill in the art in light of the following.

DETAILED DESCRIPTION OF THE PREFERRED EMBODIMENT

Figure 1:
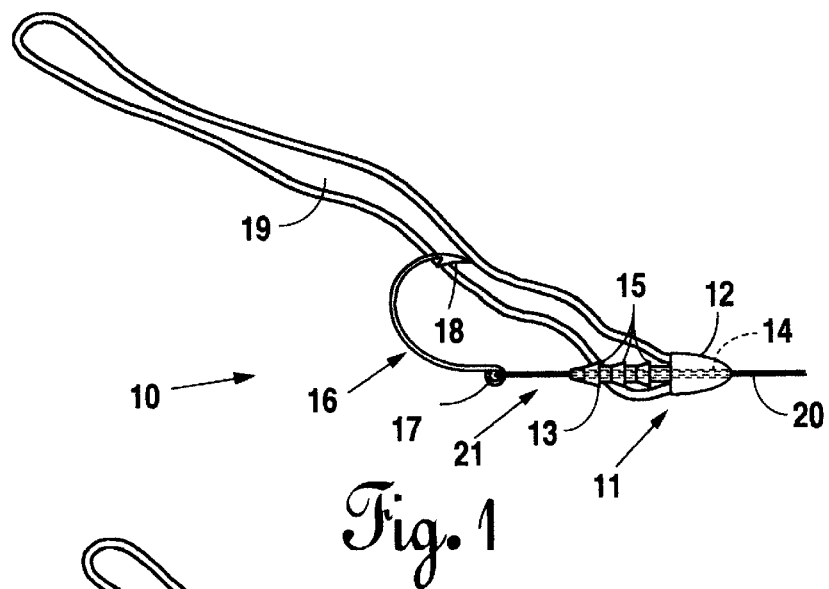
FIG. 1 is a side elevation view illustrating a first embodiment of a fish catching system in a first or unmanipulated position.
Figure 2:
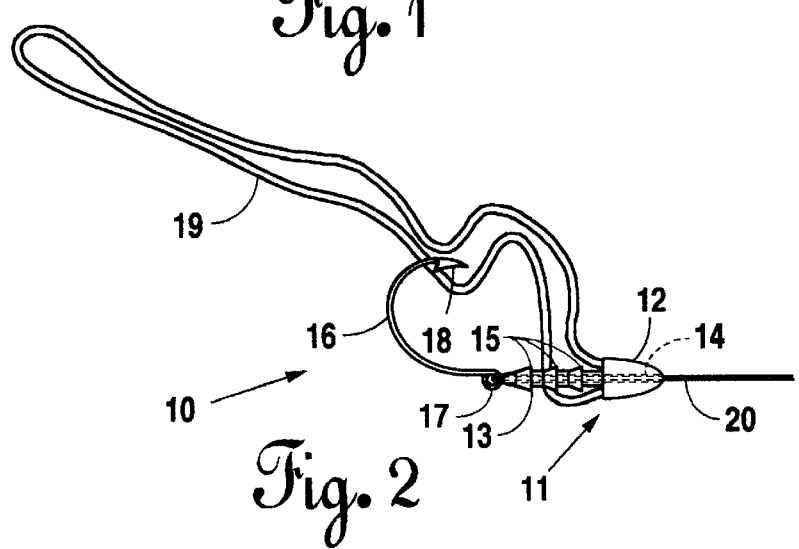
FIG. 2 is a side elevation view illustrating the first embodiment of a fish catching system in a second or manipulated position.

As illustrated in FIGS. 1 and 2, a fish catching system 10 according to a first embodiment includes a lure manipulator 11. The lure manipulator 11 includes a lure retainer 13, a head 12 attached to or formed integrally with the lure retainer 13, and a passageway 14 through the head 12 and the lure retainer 13. The lure retainer 13 includes concentric flanges 15 that receive a lure thereon but prevent dislodgement of the lure during the use of the lure manipulator 11. Although the first embodiment discloses the concentric flanges 15, those of ordinary skill in the art will recognize that any device, such as a barb or other detent, will be suitable to prevent the dislodgement of a lure. In this first embodiment, the head 11 is bullet-shaped and is weighted to permit sinking of the fish catching system 10, however, those of ordinary skill in the art will recognize that the lure manipulator 11 could include only the lure retainer 13 suitably weighted. The lure manipulator 11 may be constructed from any suitable material, such as lead, metal, hard plastic, hollow plastic, or the like.

The fish catching system 10 according to the first embodiment further includes a hook 16 having an eyelet 17 at a first end and a barb 18 at a second end. Although the first embodiment discloses a hook 16 including a single barb 18, those of ordinary skill in the art will recognize that any hook, such as a treble hook, may be substituted.

The fish catching system 10 according to the first embodiment still further includes a lure 19, which is soft and flexible. Although the lure 19 of the first embodiment is worm-shaped, those of ordinary skill in the art will recognize that a lure of any shape resembling game fish prey and that is constructed of soft, flexible material, such as plastic, may be used.

In use, an angler passes a fishing line 20 supported on a rod and reel through the passageway 14 of the lure manipulator 11. The hook 16 is then attached at its eyelet 17 to the end of the fishing line 20 passed through the passageway 14 such that the hook 16 resides below the lure manipulator 11. Finally, the angler places the lure 19 at one end onto the lure retainer 13 of the lure manipulator 11 and inserts the barb 18 of the hook 16 along the body of the lure 19 in a location that creates a space 21 between the end of the lure retainer 13 and the eyelet 17, thereby placing the fish catching system 10 in a first or unmanipulated position as illustrated in FIG. 1.

When rigged as described above, the angler casts the fish catching system 10 into a body of water and permits the fish catching system 10 to sink to a desired depth, where it resides in the first or unmanipulated position as illustrated in FIG. 1. Once at the desired depth, the fish catching system 10 permits the angler to move the lure 19 without having to retrieve the fishing line 20 utilizing the reel. The angler grasps the fishing line 20 and pulls it a limited distance, resulting in the fishing line 20 passing forward through the passageway 14 of the lure manipulator 11. Alternatively, the angler may move the rod to facilitate the passing forward of the fishing line 20 through the passageway 14. As the fishing line 20 passes forward through the passageway 14, the hook 16 travels toward the lure manipulator 11 until its eyelet 17 contacts the end of the lure retainer 13, thereby eliminating the space 21, compressing the lure 19, and moving the fish catching system 10 into a second or manipulated position as illustrated in FIG. 2.

Upon reaching the second or manipulated position, the angler looses the tension in the fishing line 20, allowing the release of the elastic energy stored in the lure 19 due to its compression and facilitating the return of the fishing line 20 rearward through the passageway 14. As the fishing line 20 passes rearward through the passageway 14, the eyelet 17 of the hook 16 travels away from the end of the lure retainer 13, thereby recreating the space 21, uncompressing the lure 19, and moving the fish catching system 10 into its first or unmanipulated position.

In moving back and forth between the first or unmanipulated position and the second or manipulated position, the lure 19 compresses and releases (i.e., "wiggles") to simulate movement of live game fish prey in the body of water. In systematically "wiggling" the lure 19, the angler attempts to attract a game fish's attention resulting in a strike upon the lure 19 and the subsequent hooking of the game fish via the hook 16. After "wiggling" the lure 19 in place, the angler still has the option of pulling the fish catching system 10 off bottom, reeling it to a new location, and allowing it to return to the bottom before again "wiggling" the lure 19. The angler repeats the foregoing procedure until a game fish strikes or the fish catching system 10 has been retrieved completely.

The fish catching system 10 therefore permits movement or "wiggling" of the lure 19 regardless of whether the lure 19 resides on the bottom. This improves over reeling induced movement because the enlarged time span during which the lure 19 moves or "wiggles" significantly increases the odds of a game fish noticing and striking the lure 19.

Figure 3:
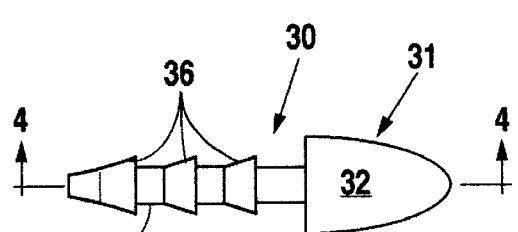
FIG. 3 is a left side elevation view illustrating a lure manipulator according to a second embodiment of a fish catching system.
Figure 5:
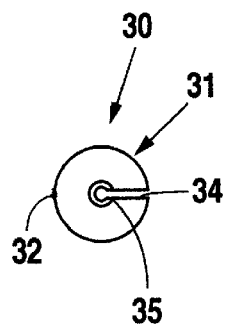
FIG. 5 is a front elevation view illustrating the lure manipulator according to the second embodiment of a fish catching system.
Figure 4:
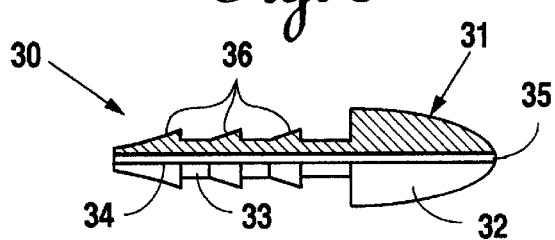
FIG. 4 is a cross-sectional view taken along lines 4,4 of FIG. 3 illustrating the lure manipulator according to the second embodiment of a fish catching system.

As illustrated in FIGS. 3–5, a fish catching system 30 according to a second embodiment includes a lure manipulator 31. The lure manipulator 31 includes a lure retainer 33, a head 32 attached to or formed integrally with the lure retainer 33, and a slot 34 through the head 32 and the lure retainer 33 that terminates in a passageway 35 also through the head 32 and the lure retainer 33. The lure retainer 33 includes concentric flanges 36 that receive a lure thereon but prevent dislodgement of the lure during the use of the lure manipulator 31. Although the second embodiment discloses the concentric flanges 36, those of ordinary skill in the art will recognize that any device, such as a barb or other detent, will be suitable to prevent the dislodgement of a lure. In this second embodiment, the head 31 is bullet-shaped and is weighted to permit sinking of the fish catching system 30, however, those of ordinary skill in the art will recognize that the lure manipulator 31 could include only the lure retainer 33 suitably weighted. The lure manipulator 31 may be constructed from any suitable material, such as lead, metal, hard plastic, hollow plastic, or the like.

Figure 6:
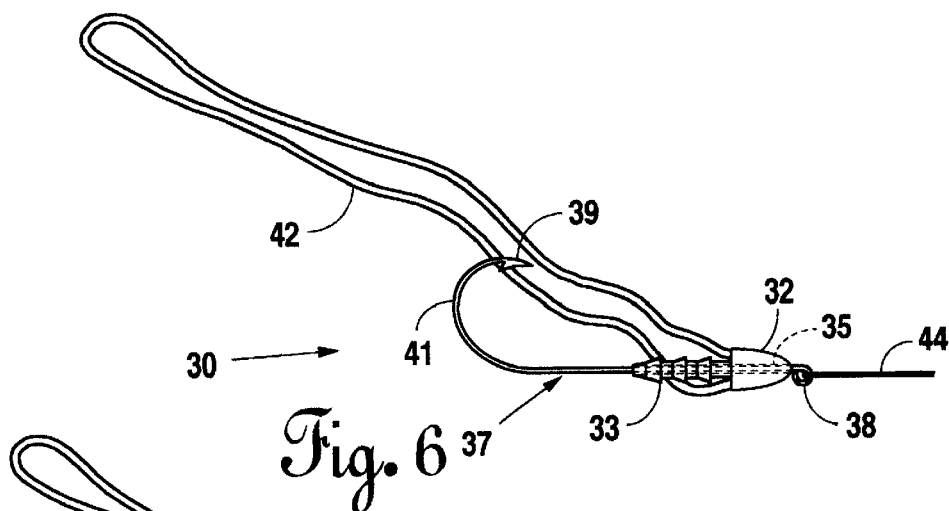
FIG. 6 is a side elevation view illustrating the second embodiment of a fish catching system in a first or unmanipulated position.
Figure 7:
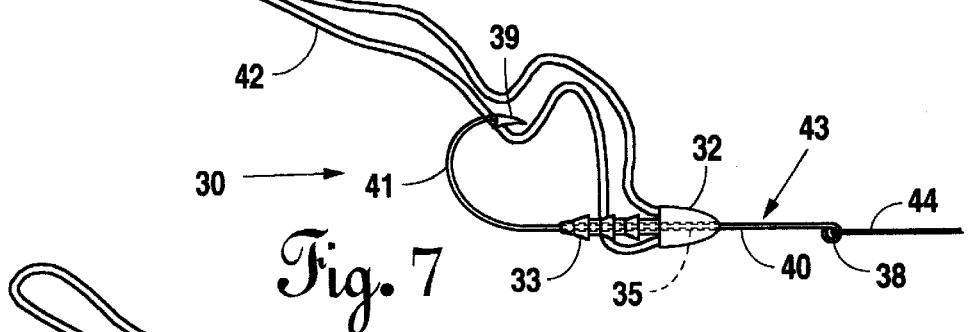
FIG. 7 is a side elevation view illustrating the second embodiment of a fish catching system in a second or manipulated position.

As illustrated in FIGS. 6 and 7, the fish catching system 30 according to the second embodiment further includes a hook 37 having a shaft 40 terminating in an eyelet 38 at a first end and a curvature 41 terminating in a barb 39 at a second end. Although the second embodiment discloses a hook 37 including a single barb 39, those of ordinary skill in the art will recognize that any hook, such as a treble hook, may be substituted.

The fish catching system 30 according to the second embodiment still further includes a lure 42, which is soft and flexible. Although the lure 42 of the second embodiment is worm-shaped, those of ordinary skill in the art will recognize that a lure of any shape resembling game fish prey and that is constructed of soft, flexible material, such as plastic, may be used.

In use, an angler places the shaft 40 of the hook 37 through the slot 34 of the lure manipulator 31 until the shaft 40 resides within the passageway 35 of the lure manipulator 31. The angler then crimps the slot 34 closed, thus sealing the lure manipulator 31 around the shaft 40 below the eyelet 38 of the hook 37. The passageway 35 however is sized such that the lure manipulator 31 freely slides along the shaft 40 of the hook 37. Next, the angler attaches a fishing line 44 supported on a rod and reel to the eyelet 38 of the hook 37. Finally, the angler places the lure 42 at one end onto the lure retainer 33 of the lure manipulator 31 and inserts the barb 39 of the hook 37 along the body of the lure 42 in a location that abuts the head 32 of the lure manipulator 31 with the eyelet 38, thereby placing the fish catching system 30 in a first or unmanipulated position as illustrated in FIG. 6.

When rigged as described above, the angler casts the fish catching system 30 into a body of water and permits the fish catching system 30 to sink to a desired depth, where it resides in the first or unmanipulated position as illustrated in FIG. 6. Once at the desired depth, the fish catching system 30 permits the angler to move the lure 42 without having to retrieve the fishing line 44 utilizing the reel. The angler grasps the fishing line 44 and pulls it a limited distance, resulting in the shaft 40 of the hook 37 passing forward through the passageway 35 of the lure manipulator 31. Alternatively, the angler may move the rod to facilitate the passing forward of the shaft 40 through the passageway 35. The shaft 40 passes forward through the passageway 35 until the curvature 41 of the hook 37 contacts the lure retainer 33 of the lure manipulator 31, thereby creating the space 43, compressing the lure 42, and moving the fish catching system 30 into a second or manipulated position as illustrated in FIG. 7.

Upon reaching the second or manipulated position, the angler looses the tension in the fishing line 44, allowing the release of the elastic energy stored in the lure 42 due to its compression and facilitating the return of the shaft 40 rearward through the passageway 35. The shaft 40 passes rearward through the passageway 35 until the eyelet 38 of the hook 37 abuts the head 32 of the lure manipulator 31, thereby eliminating the space 43, uncompressing the lure 42, and moving the fish catching system 30 into its first or unmanipulated position.

In moving back and forth between the first or unmanipulated position and the second or manipulated position, the lure 42 compresses and releases (i.e., "wiggles") to simulate movement of live game fish prey in the body of water. In systematically "wiggling" the lure 42, the angler attempts to attract a game fish's attention resulting in a strike upon the lure 42 and the subsequent hooking of the game fish via the hook 37. After "wiggling" the lure 42 in place, the angler still has the option of pulling the fish catching system 30 off bottom, reeling it to a new location, and allowing it to return to the bottom before again "wiggling" the lure 42. The angler repeats the foregoing procedure until a game fish strikes or the fish catching system 30 has been retrieved completely.

The fish catching system 30 therefore permits movement or "wiggling" of the lure 42 regardless of whether the lure 42 resides on the bottom. This improves over reeling induced movement because the enlarged time span during which the lure 42 moves or "wiggles" significantly increases the odds of a game fish noticing and striking the lure 42.

As illustrated in FIGS. 8–11, a fish catching system 50 according to a third embodiment includes a hook 51 having a shaft 52 terminating in an eyelet 53 at a first end and a curvature 54 terminating in a barb 55 at a second end. Although the third embodiment discloses a hook 51 including a single barb 55, those of ordinary skill in the art will recognize that any hook, such as a treble hook, may be substituted.

The fish catching system 50 according to the third embodiment further includes a lure manipulator 56. The lure manipulator 56 includes a lure retainer 58, a head 57 attached to or formed integrally with the lure retainer 58, and a passageway 59 through the head 57 and the lure retainer 58. The passageway 59 permits the lure manipulator 56 to reside about the shaft 52 of the hook 51. The lure manipulator 56 secures about the shaft 52 during the manufacturing process of the fish catching system 50 using any of several standard and well-known techniques. The passageway 59 however is sized such that the lure manipulator 56 freely slides along the shaft 52 of the hook 51. The lure retainer 58 includes concentric flanges 60 that receive a lure thereon but prevent dislodgement of the lure during the use of the lure manipulator 56. Although the third embodiment discloses the concentric flanges 60, those of ordinary skill in the art will recognize that any device, such as a barb or other detent, will be suitable to prevent the dislodgement of a lure. In this third embodiment, the head 57 is bullet-shaped and is weighted to permit sinking of the fish catching system 50, however, those of ordinary skill in the art will recognize that the lure manipulator 56 could include only the lure retainer 58 suitably weighted. The lure manipulator 56 may be constructed from any suitable material, such as lead, metal, hard plastic, hollow plastic, or the like.

The fish catching system 50 according to the third embodiment still further includes a lure 61, which is soft and flexible. Although the lure 61 of the third embodiment is worm-shaped, those of ordinary skill in the art will recognize that a lure of any shape resembling game fish prey and that is constructed of soft, flexible material, such as plastic, may be used.

In use, an angler attaches a fishing line 63 supported on a rod and reel to the eyelet 53 of the hook 51. The angler then places the lure 61 at one end onto the lure retainer 58 of the lure manipulator 56 and inserts the barb 55 of the hook 51 along the body of the lure 61 in a location that abuts the head 57 of the lure manipulator 56 with the eyelet 53, thereby placing the fish catching system 50 in a first or unmanipulated position as illustrated in FIGS. 8 and 10.

Figure 8:
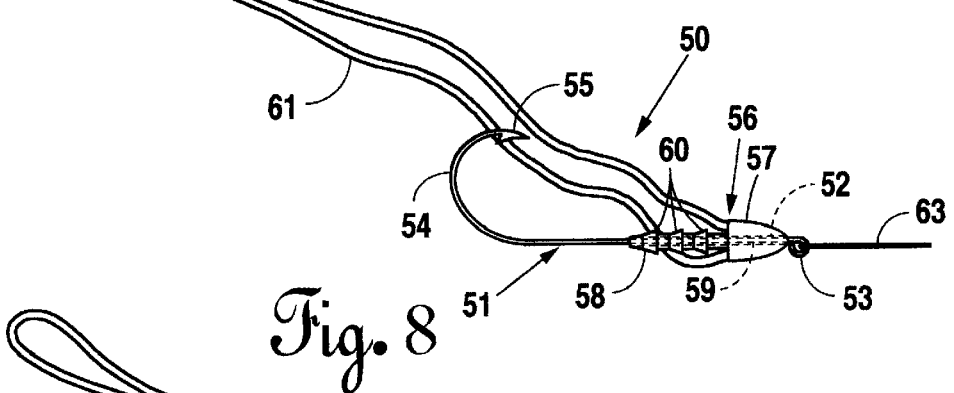
FIG. 8 is a side elevation view illustrating a third embodiment of a fish catching system in a first or unmanipulated position.
Figure 9:
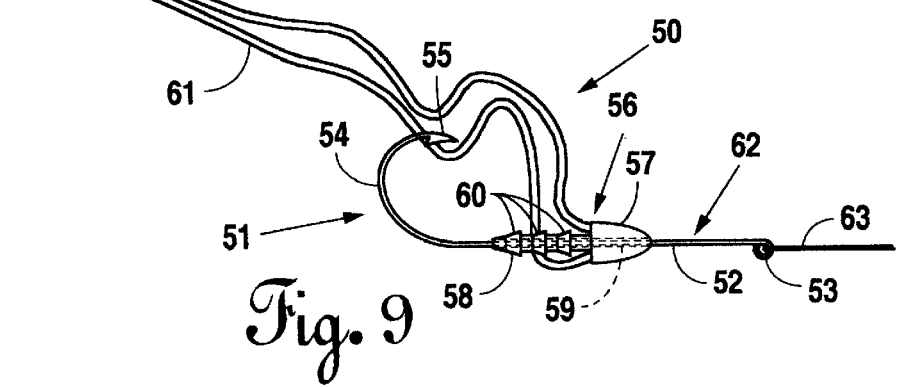
FIG. 9 is a side elevation view illustrating the third embodiment of a fish catching system in a second or manipulated position.
Figure 10:
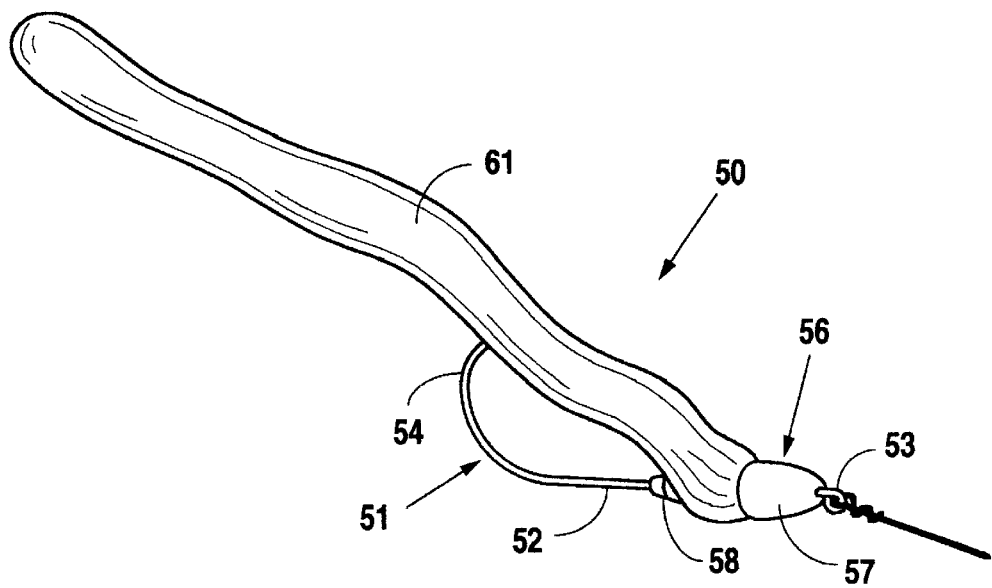
FIG. 10 is a perspective view illustrating the third embodiment of a fish catching system in a first or unmanipulated position.
Figure 11:
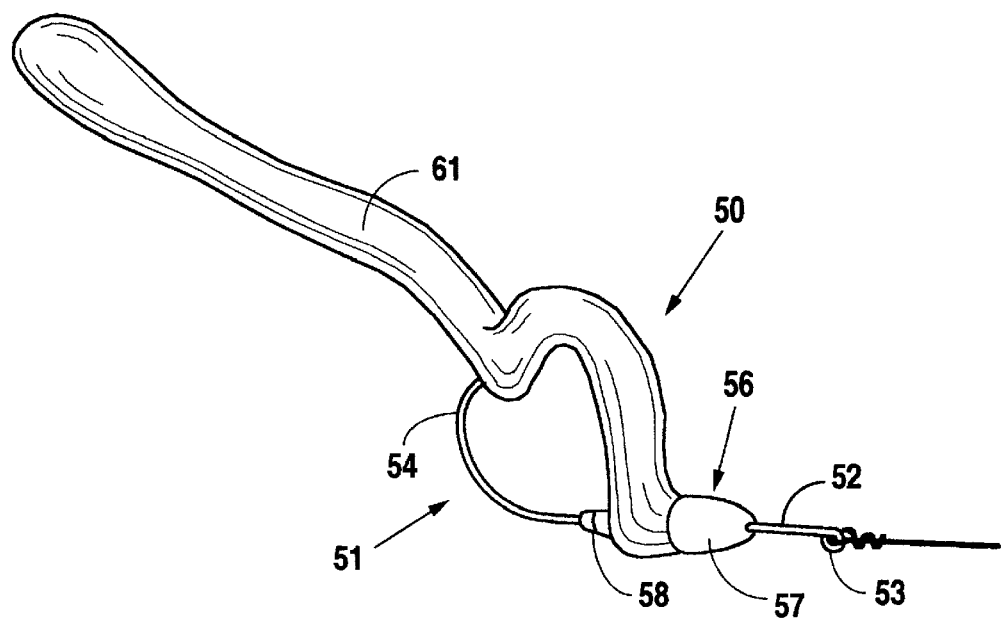
FIG. 11 is a perspective view illustrating the third embodiment of a fish catching system in a second or manipulated position.

When rigged as described above, the angler casts the fish catching system 50 into a body of water and permits the fish catching system 50 to sink to a desired depth, where it resides in the first or unmanipulated position as illustrated in FIGS. 8 and 10. Once at the desired depth, the fish catching system 50 permits the angler to move the lure 61 without having to retrieve the fishing line 63 utilizing the reel. The angler grasps the fishing line 63 and pulls it a limited distance, resulting in the shaft 52 of the hook 51 passing forward through the passageway 59 of the lure manipulator 56. Alternatively, the 6 angler may move the rod to facilitate the passing forward of the shaft 52 through the passageway 59. The shaft 52 passes forward through the passageway 59 until the curvature 54 of the hook 51 contacts the lure retainer 58 of the lure manipulator 56, thereby creating the space 62, compressing the lure 61, and moving the fish catching system 50 into a second or manipulated position as illustrated in FIGS. 9 and 11.

Upon reaching the second or manipulated position, the angler looses the tension in the fishing line 63, allowing the release of the elastic energy stored in the lure 61 due to its compression and facilitating the return of the shaft 52 rearward through the passageway 59. The shaft 52 passes rearward through the passageway 59 until the eyelet 53 of the hook 51 abuts the head 57 of the lure manipulator 56, thereby eliminating the space 62, uncompressing the lure 61, and moving the fish catching system 50 into its first or unmanipulated position.

In moving back and forth between the first or unmanipulated position and the second or manipulated position, the lure 61 compresses and releases (i.e., "wiggles") to simulate movement of live game fish prey in the body of water. In systematically "wiggling" the lure 61, the angler attempts to attract a game fish's attention resulting in a strike upon the lure 61 and the subsequent hooking of the game fish via the hook 51. After "wiggling" the lure 61 in place, the angler still has the option of pulling the fish catching system 50 off bottom, reeling it to a new location, and allowing it to return to the bottom before again "wiggling" the lure 61. The angler repeats the foregoing procedure until a game fish strikes or the fish catching system 50 has been retrieved completely.

The fish catching system 50 therefore permits movement or "wiggling" of the lure 61 regardless of whether the lure 61 resides on the bottom. This improves over reeling induced movement because the enlarged time span during which the lure 61 moves or "wiggles" significantly increases the odds of a game fish noticing and striking the lure 61.

Although the present invention has been described in terms of the foregoing embodiment, such description has been for exemplary purposes only and, as will be apparent to one of ordinary skill in the art, many alternatives, equivalents, and variations of varying degrees will fall within the scope of the present invention. That scope, accordingly, is not to be limited in any respect by the foregoing description; rather, it is defined only by the claims that follow.

I claim:

1. A fish catching system, comprising:
    a lure manipulator, comprising:
        a lure retainer,
        a passageway through the lure retainer that receives a hook therein, and
        a slot through the lure retainer terminating in the passageway, whereby the slot receives the hook therethrough and is movable to a position that retains the hook within the passageway.

2. The fish catching system according to claim 1, further comprising a hook including a barb and a shaft terminating in an eyelet that receives a fishing line, whereby the shaft passes through the slot and resides in the passageway.

3. The fish catching system according to claim 2, further comprising a lure secured in a first position to the lure retainer and to the barb, whereby pulling the fishing line moves the shaft of the hook through the passageway to place the lure in a second position and releasing the fishing line returns the shaft of the hook through the passageway to place the lure in the first position.

4. The fish catching system according to claim 3, wherein movement of the lure between the first position and the second position simulates movement of game fish prey.

5. The fish catching system according to claim 3, wherein releasing the fishing line returns the lure to the first position due to the elasticity of the lure.

6. The fish catching system according to claim 1, wherein the lure manipulator further comprises a head coupled with the lure retainer, the head including a passageway that receives the hook therein and a slot terminating in the passageway that receives the hook therethrough and is movable to a position that retains the hook within the passageway.

7. A fish catching system, comprising:
    a hook including a barb and a shaft terminating in an eyelet that receives a fishing line; and
    a lure manipulator including a passageway therethrough that receives the shaft of the hook therein and a slot therethrough terminating in the passageway, whereby the slot receives the shaft of the hook therethrough and is movable to a position that retains the hook within the passageway.

8. The fish catching system according to claim 7, further comprising a lure secured in a first position to the lure manipulator and to the barb, whereby pulling the fishing line moves the shaft of the hook through the passageway, to place the lure in a second position and releasing the fishing line returns the shaft of the hook through the passageway to place the lure in the first position.

9. The fish catching system according to claim 8, wherein movement of the lure between the first position and the second position simulates movement of game fish prey.

10. The fish catching system according to claim 8, wherein releasing the fishing line returns the lure to the first position due to the elasticity of the lure.

11. The fish catching system according to claim 7, wherein the lure manipulator comprises a lure retainer.

12. The fish catching system according to claim 11, wherein the lure manipulator comprises a head coupled with the lure retainer.

13. A fish catching system, comprising:
    a hook including a barb and a shaft terminating in an eyelet that receives a fishing line; and
    a lure manipulator including a passageway therethrough that receives the shaft of the hook therein.

14. The fish catching system according to claim 13, further comprising a lure secured in a first position to the lure manipulator and to the barb, whereby pulling the fishing line moves the shaft of the hook through the passageway to place the lure in a second position and releasing the fishing line returns the shaft of the hook through the passageway to place the lure in the first position.

15. The fish catching system according to claim 14, wherein movement of the lure between the first position and the second position simulates movement of game fish prey.

16. The fish catching system according to claim 14, wherein releasing the fishing line returns the lure to the first position due to the elasticity of the lure.

17. The fish catching system according to claim 13, wherein the lure manipulator comprises a lure retainer.

18. The fish catching system according to claim 17, wherein the lure manipulator further comprises a head coupled with the lure retainer.

19. The fish catching system according to claim 13, wherein the shaft of the hook slides freely through the passageway of the lure manipulator.

* * * * *